Dec. 20, 1966  D. R. FALKENBERG ET AL  3,292,792

FILTER CARTRIDGE

Filed April 10, 1963  2 Sheets-Sheet 1

INVENTORS.
EDWARD L. SHARPE
DOUGLASS R. FALKENBERG
BY
Schramm, Kramer & Stenzel
ATTORNEYS.

Dec. 20, 1966  D. R. FALKENBERG ET AL  3,292,792
FILTER CARTRIDGE
Filed April 10, 1963  2 Sheets-Sheet 2
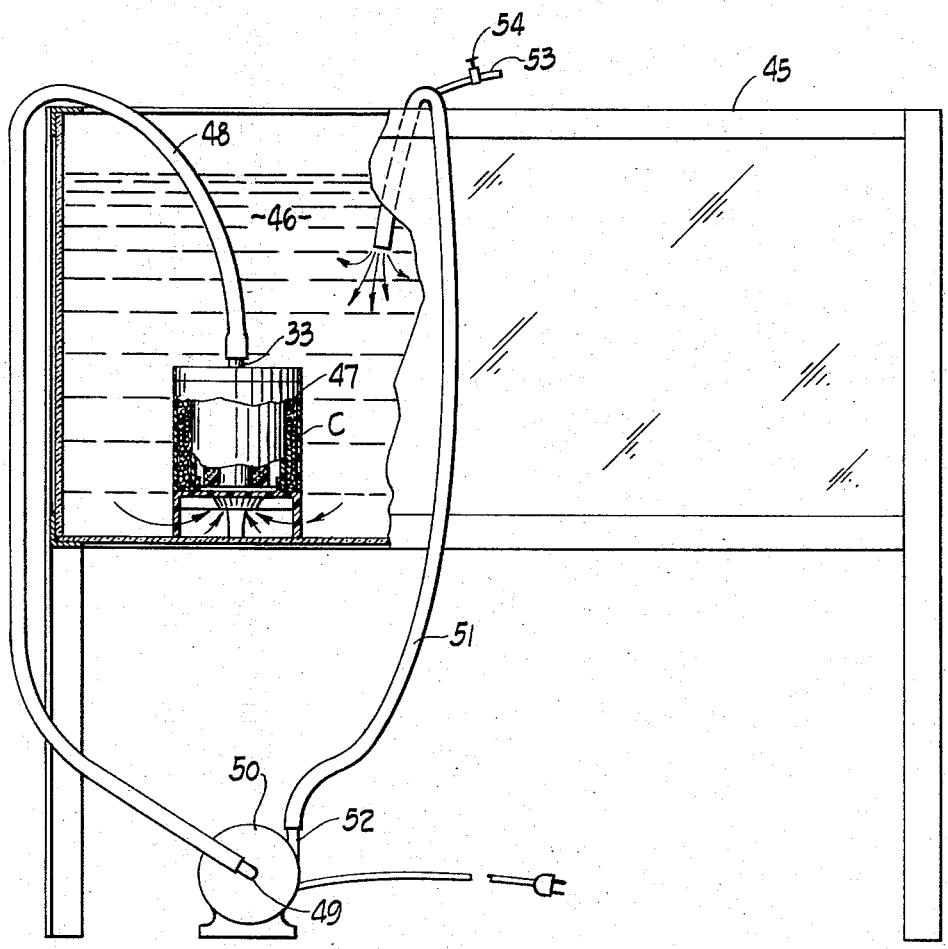
FIG_5
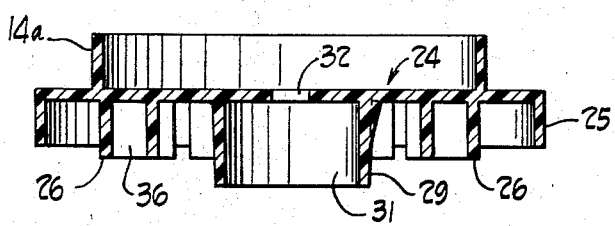
FIG_6
INVENTORS.
EDWARD L. SHARPE
BY DOUGLASS R. FALKENBERG
Schramm, Kramer & Sturges
ATTORNEYS.

United States Patent Office 3,292,792
Patented Dec. 20, 1966

3,292,792
FILTER CARTRIDGE
Douglass R. Falkenberg, 20997 Westlake Road, Rocky River, Ohio 44116, and Edward L. Sharpe, Elyria, Ohio; said Sharpe assignor to said Falkenberg
Filed Apr. 10, 1963, Ser. No. 272,002
4 Claims. (Cl. 210—450)

This invention relates, as indicated, to a cartridge for containing a filter medium, and more particularly to a simplified cartridge construction which enables easy replacement of a porous physically solid filter medium after the latter has become clogged due to prolonged use.

In the past, various means for conditioning the aqueous medium contained in aquariums for the keeping of aquatic life such as fish, lobsters, and other marine life, either domestically or commerically, have been provided. The present invention provides a novel structure which has utility as a container for an improved filter medium for use in aquariums, as hereinafter more particularly described.

This invention will be better understood by having reference to the annexed drawings which are illustrative of a preferred embodiment of the present invention, and wherein:

FIG. 5 shows a home type aquarium having the filter cartridge of this invention hooked up with a centrifugal pump and an aspirator for aeration.

FIG. 6 is a cross-sectional view of a modified cover which is useful for stacking several cartridges in series.

Briefly stated, the persent invention is in the provision of a cartridge for a removable foraminous physically solid filter medium which has an axially disposed recess therein, and characterized by a base, hollow body, and a removable cover. The base includes means for permitting fluid flow therethrough for contact with the exterior of the filter medium. The hollow body is adapted to be secured to the base and includes an inner wall defining a filter medium receiving space, and an outer wall in spaced relation to the inner wall, and means are provided for maintaining the walls in such spaced relation. The removable cover includes means coacting with the inner wall to isolate the space between the walls from the filter medium receiving space and also separate means, including an opening through the cover, for coaction between the cover and the recess in the filter medium to isolate the recess from the filter medium receiving space.

In such an apparatus, then, the aqueous medium which is to be conditioned is drawn into the cartridge through the base, and fills the space defined by the inner wall and the foraminous filter medium. The fluid is passed through the filter medium, and exits from the system through the opening in the cover which communicates with the axially disposed recess in the filter medium. The apparatus is conveniently used in conjunction with a centrifugal pump as shown in FIG. 5.

Figure 1:
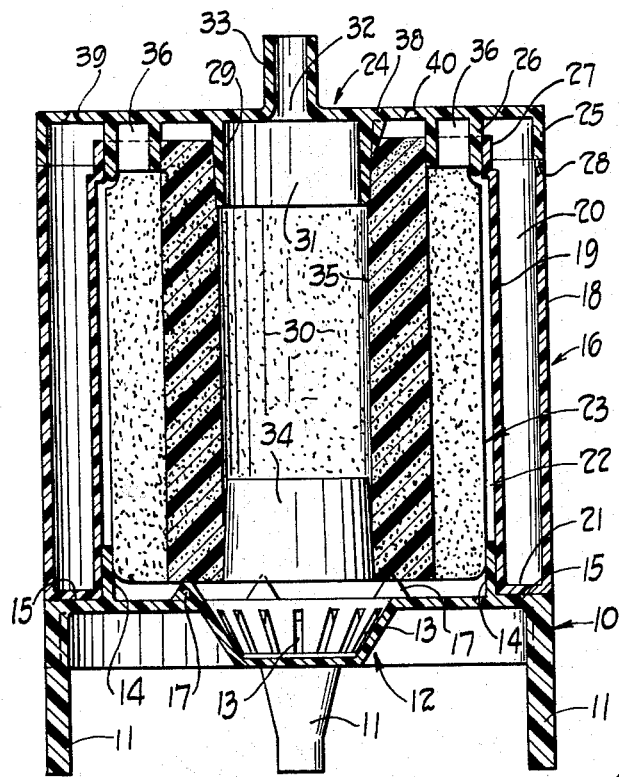
FIG. 1 is a cross-sectional view of a cartridge of the present invention showing, also in cross section, a porous or foraminous physically solid filter medium in place therein.
Figure 2:
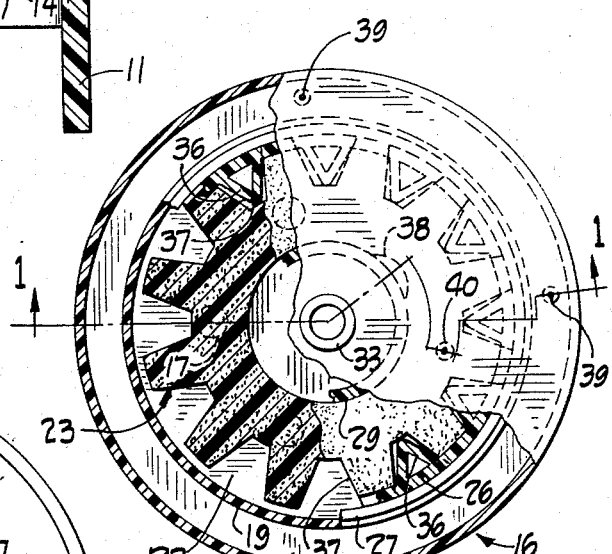
FIG. 2 is a partially cut away top elevation of the device shown in FIG. 1, successive layers having been partially cut away to better show details thereof.
Figure 3:
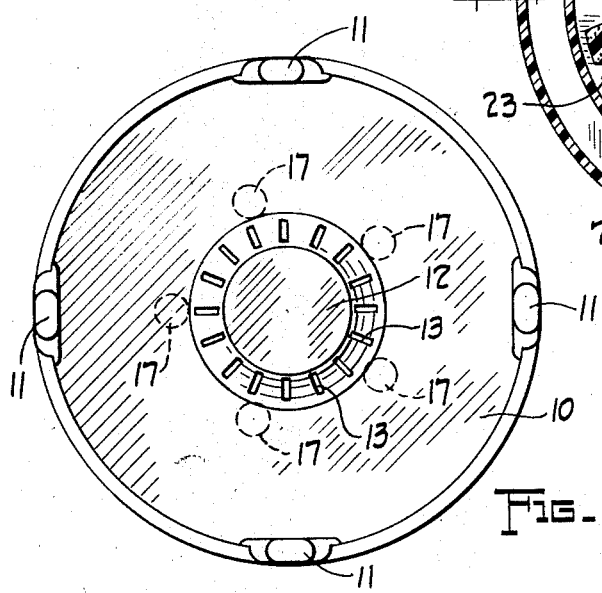
FIG. 3 is a bottom elevation of the apparatus shown in FIG. 1 showing the means for passing fluid through the bottom of the cartridge.

Referring now more particularly to FIGS. 1–3, there is provided a base 10, which in the embodiment shown is conveniently circular, and formed from an extrudable plastic material, such as, polyethylene. Base 10 is provided with a plurality of legs 11 which, while not essential elements, serve a useful function in spacing the cartridge from the bottom of an aquarium such as shown in FIG. 5 to aid in the flow of the aqueous medium to the opening through the base 10.

While any convenient opening through base 10 may be provided, in a preferred embodiment the opening is conveniently in the form of a frusto-conical section coaxially disposed and generally indicated by the numeral 12. Slits 13 provide an adequate passageway through the base, such slits preferably being disposed along elements of the frusto-conical fluid admitting means 12. By utilizing such a structure, the danger of drawing smaller fish, for example, into the interior of the cartridge is reduced.

Base 10 is provided with an upstanding circular rim 14 which defines a peripheral annular shoulder 15 against which the double walled hollow body 16 is conveniently seated. Circular rim 14 is sized and positioned to frictionally engaged and retain double walled body 16.

Base 10 is also conveniently provided with a plurality of supporting points 17 which serve to support the foraminous filter medium in spaced relation to the base 10 thereby aiding the flow of fluid for distribution to the filtering surfaces as hereinafter described.

Base 10, as indicated above, can be cast as a unit in an extrusion type plastic molding machine using polyethylene, or any other suitable thermoplastic, water insoluble resinous material.

Cartridge body 16, as indicated above, is desirably a double walled body having an outer wall 18 and an inner wall 19 in concentric spaced relation to each other and defining an annular chamber 20. Cylindrical walls 18 and 19 are desirably maintained in spaced relation by an integrally cast annular ring 21 at one extremity, and preferably adapted for coaction with the base 10 to firmly seat against shoulder 15 to provide rigid support for the body 16.

The annular chamber 20 provides a space into which a liquid, solid, or a combination of the two may be disposed for decorative purposes, and also serving as ballast to hold the cartridge-filter medium assembly in submerged, substantially stationary position in an aquarium. For example, it has been found decorative to fill the annular chamber 20 with a colored gravel of the same or contrasting color with the gravel normally used to provide a decorative base in a home aquarium.

Inner cylindrical wall 19 defines an inner chamber 22 which is adapted to receive the foraminous filter medium generally indicated at 23. As indicated above, inner cylindrical wall 19 is formed on a diameter which is adapted to coact with upstanding circular rim 14 for frictional engagement of the body 16 with the base 10.

The cartridge is completed by a cover generally indicated at 24. Cover 24 is provided with an outer circular depending skirt 25 which is adapted to coact with outer wall 18, and an inner circular rim 26 concentric therewith and of a smaller diameter than depending rim or skirt 25. Depending circular rim 26 is adapted to frictionally coact with friction ring 27 which is integrally cast with inner cylindrical wall 19. Circular rim 26 also coacts with friction retaining ring 27 to isolate annular chamber 20 from the filter medium receiving chamber 22. In the assembled condition, the outer depending skirt 25 abuts against the upper edge 28 of outer cylindrical wall 18. Provision of more complex sealing means for outer chamber 20 is unnecessary. However, because inner chamber 22, with the exception of the fluid inlet generally indicated at 12 is desirably fluid-tight, depending circular rim 26 overlaps friction retaining ring 27 for a distance sufficient to assure a substantially fluid-tight seal.

Cover 24 is also provided with a still small diameter circular depending skirt 29 which is adapted to coact with recess 30 in foraminous filter medium 23, such coaction being in fluid-tight relationship. Depending circular skirt 29 defines a cup 31 which collects fluid which has passed through foraminous filtering medium 23 and conducts it to opening 32 in cover 24 which is conveniently provided with nipple 33 to which a hose, for example a plastic tube, may be secured as shown in FIG. 5.

Recess 30 in foraminous filter 23 may be provided most conveniently by inserting plug 34 in one end of bore 35 which is axially formed in foraminous filter 23. An ordinary bottle cork provides a suitable plug 34. Alternatively, the foraminous filter member 23 may be formed so that one end is closed so that aqueous fluid is forced to pass through the pores in the filter medium.

The filter medium 23 may be of any foraminous physically solid material, such as, porous carbon, porous alumina, porous sintered metal, or porous accreted fibrous material. Very satisfactory results have been secured with a relatively rigid, self-supporting, thick walled tubular element composed entirely of resin-impregnated fibrous material. Such devices are completely disclosed in Patent 2,539,768, and the method of forming such filter elements is fully disclosed in the Patent 2,539,767.

As indicated and disclosed in these references, the filter element is intended for use in filtering liquids and particularly aqueous media that are caused to flow radially inwardly through the filter element under a differential pressure. In order to obtain the maximum filtering efficiency, the fibrous structure of the filter element is of graded porosity, with the size of the pores progressively increasing radially outwardly toward the outer surface. By virtue of such graded porosity or density, as the fluid flows inwardly through progressively smaller and more numerous interstices, the foreign particles to be filtered out penetrate varying ducts according to their size. The graded porosity in the filter element is accomplished by accreting resin-impregnated fibers from a liquid dispersion of such fibers under controlled conditions as to the amount of vacuum used in effecting such accretion and as to the composition characteristics of the fibrous stock used. In making the preferred filter element, wool fibers are the principal fibrous materials employed with up to 40% by weight of other fibers such as esparto, Yucca, asbestos and the like. The fibrous material is first beaten and added to a liquid disperson of a resin such as melamine-formaldehyde, in a solvent, or any suitable liquid suspending medium. The resulting mixture is brought to proper consistency and then fed to felting tank where it is kept thoroughly agitated in order to maintain a uniform consistency throughout the entire mass.

In accordance with the disclosure of Patent 2,539,767, there is employed a perforated former or die which is immersed in the liquid suspension of fibers within the felting tank, and the resin-impregnated fibers are caused to be accreted upon the formers by the application of a controlled degree of suction imposed upon the interior of such formers. By controlling the degree of vacuum and the length of time over which it is applied, in conjunction with the proper control of the characteristics of the fibers, a filter medium is produced of the depth, or thickness, and graded porosity that is desired. The proportion of resin in the fibrous body is also a factor in producing a filter element of the desired degree of strength to withstand the pressure drive to which it may be subjected in use. A specific composition that has been found particularly suitable is one comprising 85% wool fibers and 15% esparto fibers, and having 35% resin content by weight of the finished filter element.

Figure 4:
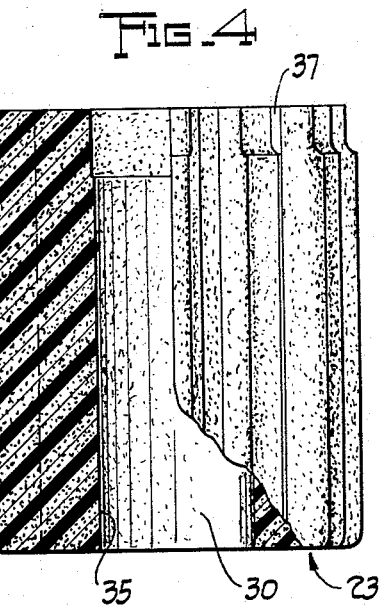
FIG. 4 is a partially cut away elevation of a foraminous physically solid filter medium of the type which is particularly useful in the cartridges of the present invention.

The filter elements may be used in the cylindrical form having a slightly tapered bore axially disposed therein, such bore being the result of forming the filter medium upon a tapered porous former or mandrel. It is preferred in the filtering of aquarium media that the filter be fluted, as is best shown in FIGS. 2 and 4, in order to increase the surface exposed to the aqueous medium to be filtered, and also to present a variety of porosities to the medium being filtered.

In order to stabilize a filter medium shaped with longitudinal flutes or grooves, and prevent undesirable rotation thereof and possible breaking of desired fluid-tight seals, there have been provided and integrally cast with cover 24 a plurality of circumferentially disposed stabilizing fingers or projections 36 which coact with the grooves 37 longitudinally cut in the body of filter medium 23. Supporting points 17 on the base 10 coact to maintain projections 36 in interlocking engagement with the grooves 37.

Also as shown in FIG. 1, there are conveniently provided one or more detents 38 (diverging toward the exterior) on the outer marginal surface of cup 31 for the purpose of aiding in frictionally seating and retaining filter member 23 in fluid-tight sealing engagement therewith.

In order to permit air to escape from the cartridge when the assembly is initially submerged in the aquarium as shown in FIG. 5, a plurality of spaced air release vents 39 may be provided to exhause air from chamber 20, and one or more air release vents 40 may be provided to release air from the inner chamber 22.

FIG. 5 shows a conventional home type aquarium fitted with the filter and filter cartridge of the present invention in one system which may be used for conditioning the water contained therein. Accordingly, there is here shown an aquarium 45 containing an aqueous medium generally indicated at 46. The aqueous medium may be either fresh water or saline depending upon the nature of the aquatic life contained therein. A filter cartridge of the type shown in FIG. 1 is generally indicated at C, that portion corresponding to chamber 20 being filled with a gravel ballast 47 to aid in maintaining the cartridge on the bottom of the aquarium 45. Outlet tube 48 is conveniently any flexible tubular material such as polyethylene, and is secured to the cartridge C by forcing the tubing 48 over the nipple 33. Tubing 48 is connected to the inlet 39 of centrifugal pump 50. Return line 51 is connected to the outlet 52 and returns the filtered aqueous medium to aquarium 45. As indicated above, the return line may be provided with a small diameter air bleed-in tube 53 having clamp 54 thereon for regulating the amount of air introduced into the line.

The apparatus shown in FIG. 5 provides a very convenient means for adequately conditioning the water for the maintenance of marine life in a domestic or commercial aquarium, particularly for display or decorative purposes. The water is conditioned not only helpfully for the marine life, but because of the remarkable clarity, the decorative aspects of an aquarium so fitted are greatly enhanced.

As indicated above, instead of using the preferred resin bonded fibrous filter medium 23 above described, there may also be used other foraminous media which in addition to removing undesired foreign particulate material from an aqueous medium, may also serve to condition the aqueous medium by removing one or more dissolved components, or by itself dissolving and beneficially fortifying an aqueous medium being passed therethrough. For example, a filter medium having substantially the same shape as shown in the annexed drawings and formed from activated carbon may be used to clarify an aqueous medium containing unfilterable colloidally dispersed particles, such as waste proteins.

A plurality of cartridges of the type shown in the annexed drawings may be assembled in series so that water from an aquarium may be sequentially subjected to a variety of treatments for the purpose of conditioning the water for the beneficiation of aquatic life contained therein. Thus, for example, by modifying the cover 24 to provide an upstanding circular rim corresponding to circular rim 14, the cover 24 may be readily converted to a base with respect to another body member corresponding to body 16 supra imposed thereon. In such manner, a number of cartridges may be assembled in series for conditioning and treating an aqueous medium as may be desired.

It has been found most unexpectedly, that the melamineformaldehyde resins binder used in forming the resin bonded fibrous filter media as described in Patent 2,539,768 coacts especially with fresh water and saline media to reduce the quantity of nitrogen-containing contaminants. In aquarium media, excessive build up of nitrogen containing contaminants from the waste products of aquatic animal life, particularly in the case of lobsters, seriously limits the length of time that such animals can be kept alive. It has been found that the melamineformaldehyde resin as deposited from a 50% solids solution in butyl alcohol is particularly effective as an adsorbent for nitrogenous matter.

In an ordinary 15 gallon fresh water fish tank, it has been found that with a normal stock of tropical fish, these filter media are effective to maintain the aquarium medium brilliantly clear and at a bacteria count which is less than the bacterial count in municipally treated drinking water for periods of time ranging upwards of two months. The replacement filter media are relatively inexpensive, and because of the simplified construction of the cartridge are readily replaced.

Using a centrifugal pump such as shown in FIG. 5, and a plastic or polyethylene return pipe, the pipe may be provided with means for admitting air into the return line so that oxygen is continuously admitted to the returning stream to maintain the oxygen level in the water at the proper point to sustain aquatic life.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A device for filtering aqueous medium in aquariums containing aquatic animal life, comprising in combination:
   (a) a circular base;
   (b) a porous physically solid filter medium having an axially disposed recess with one end open, positioned on the base such that the longitudinal axis of the recess is substantially normal to the plane of the base, and the open recess end is farthest from the base;
   (c) a hollow cylindrical body extending from the base and surrounding the filter medium, including:
      (1) an inner cylindrical wall coacting with the base to form a fluid chamber for receiving the filter medium, the end of the fluid chamber farthest from the base being open;
      (2) a concentrically disposed outer cylindrical wall coacting with the inner cylindrical wall, to form a chamber for holding ballast, the end of the ballast chamber farthest from the base being open;
   (d) a circular cover removably mounted on the hollow body for sealing the open ends of the fluid and ballast chambers and the recess in the filter medium positioned on the base;
   (e) means coacting with the base for allowing fluid to flow into the fluid chamber for contact with the filter medium, said means including at least one slit disposed in the base, the width of the slit being narrow relative to the length of the slit such that smaller species of aquatic animal life will not be drawn into the fluid chamber;
   (f) means coacting with the filter medium for positioning the filter medium on the base and in the fluid chamber;
   (g) means coacting with the cover for allowing fluid to flow from the recess in the filter medium; and
   (h) means coacting with the base for holding the filter medium in spaced relation from the slit.

2. The filtering device of claim 1 wherein the slit is one of a plurality of slits disposed in the conical surface of a concentrically formed frusto-conical appendage projecting from the plane of the base, and the filter medium holding means (h) includes a plurality of projections circumferentially spaced around the frusto-conical appendage.

3. The filtering device of claim 2, wherein the positioning means (f) includes a centrally disposed circular rim extending from the base for engaging the end of the filter medium adjacent the base.

4. The filtering device of claim 1 which includes a centrally disposed circular skirt extending from the cover for engagement in the open end of the filter medium recess, and a hollow nipple for frictionally engaging a tube, extending from the cover in opposed relation to the circular skirt, and communicating with the space defined by the circular skirt.

References Cited by the Examiner

UNITED STATES PATENTS

| | | | |
|---|---|---|---|
| 327,646 | 10/1885 | Bingham | 210—446 X |
| 2,539,768 | 1/1951 | Anderson | 210—457 X |
| 2,676,921 | 4/1954 | Vonsteenkiste | 210—169 |
| 2,732,950 | 1/1956 | Keight et al. | 210—186 |
| 2,781,913 | 2/1957 | Thompson | 210—496 X |
| 3,152,987 | 10/1964 | Gare | 210—169 |
| 3,160,588 | 12/1964 | Alarie | 210—457 |

REUBEN FRIEDMAN, *Primary Examiner.*

SAMIH ZAHARNA, *Examiner.*